No. 695,895. Patented Mar. 18, 1902.
V. V. TORBENSEN.
MOTOR VEHICLE.
(Application filed June 26, 1901.)
(No Model.) 2 Sheets—Sheet 1.

WITNESSES:

INVENTOR
Viggo V. Torbensen
BY
John R. Nolan
ATTORNEY

No. 695,895. Patented Mar. 18, 1902.
V. V. TORBENSEN.
MOTOR VEHICLE.
(Application filed June 26, 1901.)
(No Model.) 2 Sheets—Sheet 2.
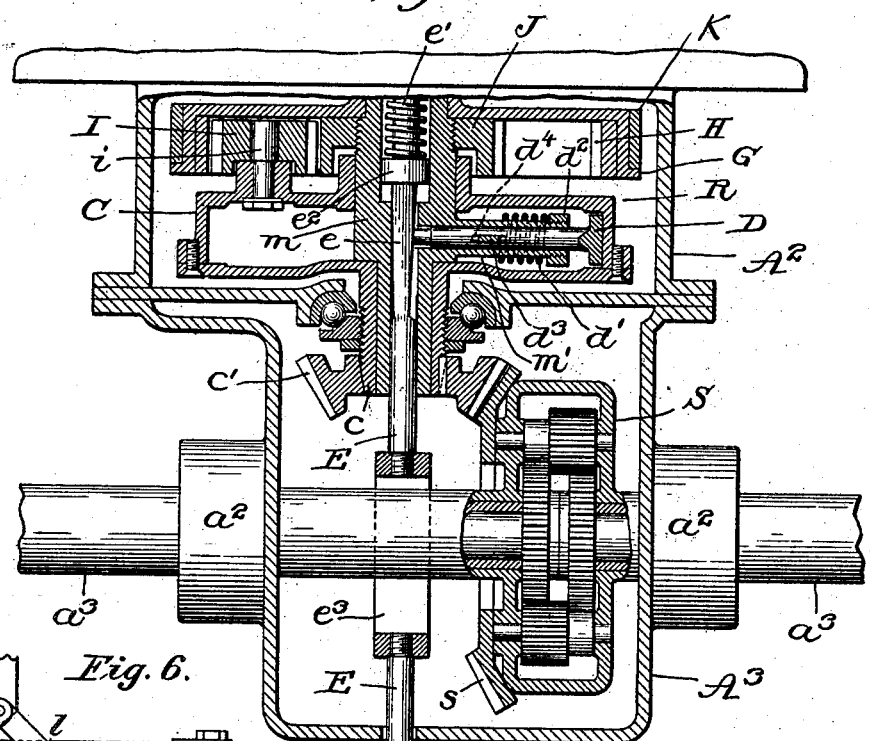
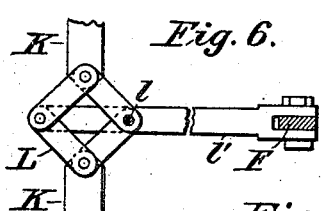
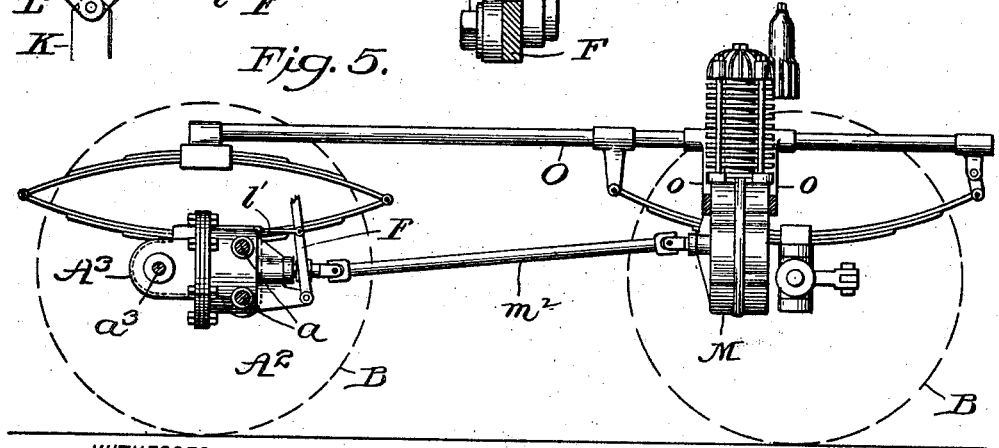
WITNESSES:
INVENTOR
Viggo V. Torbensen,
BY John R. Nolan
ATTORNEY

UNITED STATES PATENT OFFICE.

VIGGO V. TORBENSEN, OF BLOOMFIELD, NEW JERSEY.

MOTOR-VEHICLE.

SPECIFICATION forming part of Letters Patent No. 695,895, dated March 18, 1902.

Application filed June 26, 1901. Serial No. 66,065. (No model.)

*To all whom it may concern:*

Be it known that I, VIGGO V. TORBENSEN, a citizen of the United States, residing at the city of Bloomfield, in the county of Essex and State of New Jersey, have invented certain new and useful Improvements in Motor-Vehicles, of which the following is a full, clear, and exact description, reference being had to the accompanying drawings, forming a part of this specification.

This invention relates to motor-vehicles, and more especially to power-transmission mechanism therefor, my object herein being to provide a motor-vehicle in which the transmission-gearing shall constitute a component part of the main axle to insure absolute rigidity and parallelism between the latter and the said gearing, and also to provide such a vehicle in which the motor-shaft shall be mounted at right angles to said axle and geared with the carrying-wheels in a manner to secure compactness of construction and efficiency of operation, as will be hereinafter particularly described and claimed.

Figure 1:
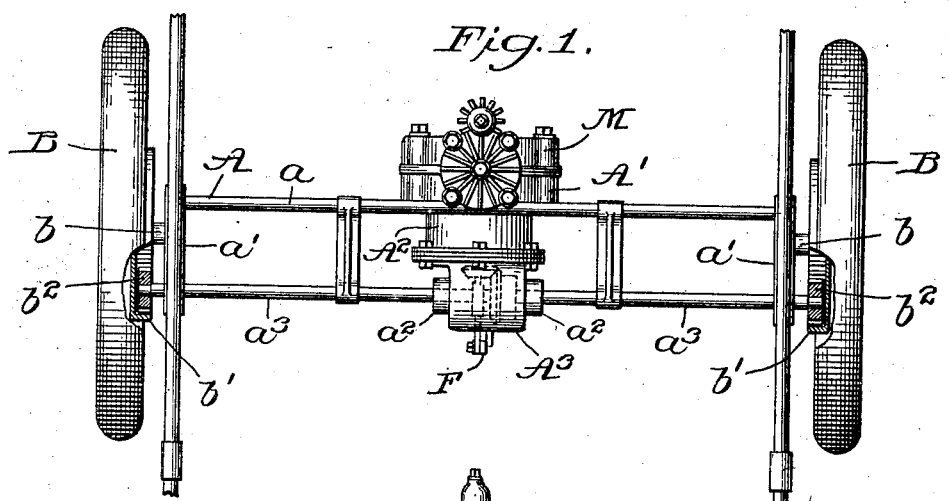
Figure 2:
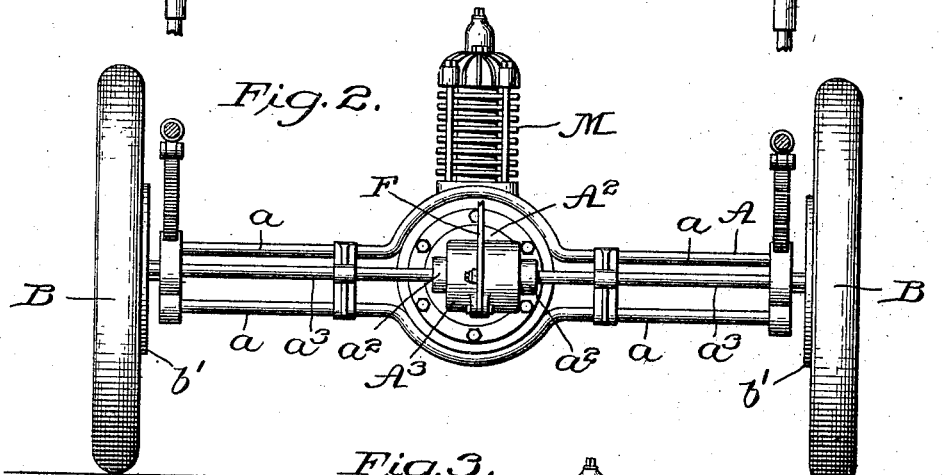
Figure 3:
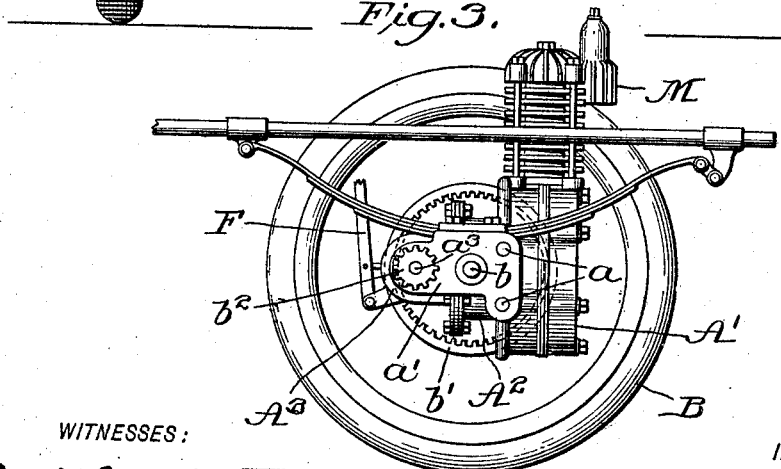

In the drawings, Figure 1 is a plan, partly in section, of a portion of a motor-vehicle embodying my invention. Fig. 2 is an end elevation thereof. Fig. 3 is a side elevation of the same, the near wheel being removed. Fig. 4 is a horizontal section, enlarged, through the transmission-gearing. Fig. 5 is a sectional elevation of a portion of a motor-vehicle, showing a modification in which the motor is supported independently of the driving-axle. Fig. 6 is a plan of the toggle connections between the brake-band and the operating-lever.

A represents the axle, and B the carrying-wheels, of the vehicle. This axle comprises two horizontal bars or tubes $a$, arranged one above the other and united at their ends by blocks $a'$ and at the center by the casing $A'$ of the motor M. Projecting forwardly from the motor-casing are two casings $A^2 A^3$, in the latter of which are bearings $a^2$, that support the respective sections of a divided driving-shaft $a^3$, the outer ends of said sections being journaled in bearings formed in the blocks $a'$, respectively. Between the driving-shaft and the axle are studs $b$, on which the carrying-wheels are mounted. On each of these wheels is an internal gear-wheel $b'$, with which co-acts a pinion $b^2$ on the adjacent end of the sectional driving-shaft, whereby when the latter is actuated the carrying-wheels will be driven. The casings $A^2$ and $A^3$ contain transmission-gearing between the motor and the driving-shaft $a^3$, the motor-shaft $m$ being arranged at right angles to the axle and in line with the axis of the driving-shaft, so as to extend into the casing $A^2$. The transmission-gearing herein illustrated comprises changeable-speed gearing R in the casing $A^2$ and differential-speed gearing S in the casing $A^3$, the latter gearing being of usual and well-known construction, such as ordinarily employed in connection with the sectional driving-axles of motor-vehicles. Although any suitable changeable-speed gearing may be employed, I prefer to use gearing of the character illustrated in Fig. 4, to which reference will now be had.

Loosely mounted on that portion of the motor-shaft $m$ within the casing $A^2$ is a clutch-case C, in which are confined a series of radial tubular arms $m'$, formed on or affixed to said shaft. In these arms are slidingly fitted the stems of clutch-segments D, that are adapted to be moved against and from the inner annular wall of the clutch-case in a manner to render the latter fast or loose on the shaft, as desired. The segments are maintained normally retracted from the wall of the case C by the action of spiral springs $d'$, which, encircling the respective arms, bear against collars $d^2$ on the latter, and opposing pins $d^3$ that extend from the stems through vertical slots $d^4$ in the respective tubular arms. The inner ends of the stems bear against the elongated tapering portion $e$ of a spindle E, which is fitted to and guided into an axial opening in the motor-shaft, whereby when the spindle is moved longitudinally in one direction the stems are gradually forced radially outward by the action thereagainst of the taper $e$ in a manner to clamp the segments against the casing, and thereby lock the latter fixedly to the shaft. When the spindle is retracted, the stems and segments resume their normal position to free the casing. The spindle is maintained normally in the forward or clamping position by a stout spiral spring $e'$, which, encircling the spindle, bears against a collar $e^2$ thereon and a suitably-disposed shoulder within the shaft, the force of said spring being sufficient to overcome the combined force of the retracting-springs $d'$ on the radial arms. The spindle is provided with a slotted member $e^3$, which embraces the shaft $a^3$, the outer end of the spindle being connected to a lever F, fulcrumed at its lower end to a lug on the casing $A^3$, whereby when the upper or free end of said lever is drawn backward the spindle is retracted against the compression of the spring $e'$ to permit the clutch-sectors to assume their normal or retracted position.

Loosely mounted on the motor-shaft, laterally of the clutch-case, is the elongated hub of a wheel G, carrying an internal spur-gear H, with the teeth of which mesh a series of laterally-disposed pinions I on the clutch-case C. These pinions are loosely mounted on studs $i$, affixed to the side of the clutch-case at regular intervals apart. Fast on the motor-shaft is a spur-wheel J, with the teeth of which said pinions are also engaged. Encircling the periphery of the wheel G is a brake-band K, the ends of which are united by toggle-jointed levers L, pivoted at $l$ to the casing $A^2$. These levers are connected by means of a rod $l'$ with the hand-lever F, whereby when the latter occupies its outward or normal position the toggle-levers are open and the brake-band is loose on the wheel, and when said lever is moved inward to effect the release of the clutch-case the toggle-levers are closed and the band drawn tightly with a braking force upon wheel G.

On the clutch-case C is an elongated hub $c$, having a bearing in the wall of the casing $A^2$. Keyed or otherwise affixed to this hub is a bevel gear-wheel $c'$, which coacts with a similar wheel $s$ of the differential gearing S, contained in the casing $A^3$.

When the hand-lever F is set in vertical position, the taper spindle E is withdrawn sufficiently to permit the clutch-segments to recede from contact with the clutch-case. The motor-shaft will rotate freely, and the wheel G, with its internal gear H, will be at rest. Upon moving the lever farther outward and against the pressure of the confined spring $e'$ the brake-band will be drawn upon the wheel G in a manner to retain the latter and the internal gear H stationary. The gear J, revolving with the shaft $m$, will rotate the pinions I, and the latter will revolve about the internal gear, thus effecting the rotation of the clutch-case C and perforce the driving-gear $c$. The ratio of speed of this gear $c$ to the speed of the motor-shaft will of course be as the ratio between the pinions L and the internal gear, and hence said gear $c$ will be driven at a reduced rate of speed in respect to that of the driving-shaft. If the lever F be now released, the spring $e'$ will force the spindle E inward, thereby effecting the release of the brake-band K and forcing the clutch-segments bodily into engagement with the clutch-case C. The latter will therefore be locked fixedly to the driving-shaft, and the speed of the driving-gear $c$ will in consequence correspond with that of said shaft—viz., normal.

By the above-described construction it will be seen that the transmission devices—to wit, the changeable and differential gearing—constitute, in effect, a component part of the main axle, thereby insuring absolute rigidity and relative parallelism of the coöperating elements; also, that the power is communicated directly to the transmission-gearing from the motor-shaft and that the power and motion are transmitted from said shaft on one side of the axis of the driving-wheels to the driving-shaft on the other side of said axis, thereby insuring a steady and uniform application of the force to said wheels. Furthermore, compactness and simplicity of construction are attained.

In Fig. 5 I have shown a slight modification in which the casing $A^2$ is supported by the bars of the axle and in which the motor instead of being mounted on the axle, as above described, is located at the opposite end of the vehicle, being supported by brackets $o$, carried by a spring-supported frame O. The shaft of the motor includes a universal coupling member $m^2$. This construction is more particularly designed for use in connection with heavy vehicles in that flexibility and freedom of movement between the body of the motor and the transmission-gearing are attained.

I claim—

1. In a motor-vehicle, an axle, supports at the ends thereof, a driving-shaft having its bearings in said supports, carrying-wheels mounted on said supports and having their axes between the axle and said shaft, gearing between the said shaft and the carrying-wheels, a motor, and gearing between said motor and the driving-shaft.

2. In a motor-vehicle, the combination with supports, a rigid connection and a driving-shaft between said supports, carrying-wheels, axial studs located on said supports, at points thereon between the rigid connection and the driving-shaft, gearing between said shaft and the carrying-wheels, a motor, including a shaft intersecting the said connection, and gearing between said latter shaft and the driving-shaft.

3. In a motor-vehicle, an axle comprising a plurality of bars, supports at the ends thereof, a casing supported by said bars, carrying-wheels mounted on said supports, a motor the shaft whereof extends into said casing, changeable-speed gearing in said casing, and operative connection between said gearing and the driving-shaft.

4. In a motor-vehicle, an axle comprising a plurality of bars, supports at the ends thereof, casings supported by said bars, carrying-wheels on said supports, a divided driving-shaft having its bearings in said supports, a motor the shaft whereof extends into one of said casings, changeable-speed gearing in the casing into which said motor-shaft extends, and coacting differential-speed gearing mounted in the other casing and connected with the driving-shaft.

5. In a motor-vehicle, an axle, a casing thereon, a motor having its shaft at right angles to the said axle and entering the said casing, a driving-shaft, carrying-wheels having their axes between the shaft and axle, gearing between the said driving-shaft and the wheels, and transmission-gearing between the said driving-shaft and the motor-shaft, said latter gearing including mechanism contained in the said casing.

6. In a motor-vehicle, an axle comprising bars, supports at the ends thereof, and a motor-casing supported by the bars between said supports, a motor in said casing, a second casing supported by the motor-casing, and into which second casing the motor-shaft extends at right angles to said axle, a driving-shaft, carrying-wheels having their axes between the shaft and axle, gearing between the said driving-shaft and the wheels, and transmission-gearing between the said driving-shaft and the motor-shaft, said latter gearing including mechanism contained in said second casing.

In testimony whereof I have hereunto affixed my signature in the presence of two subscribing witnesses.

VIGGO V. TORBENSEN.

Witnesses:
  ANDREW V. GROUPE,
  JOHN R. NOLAN.